Figure 1:
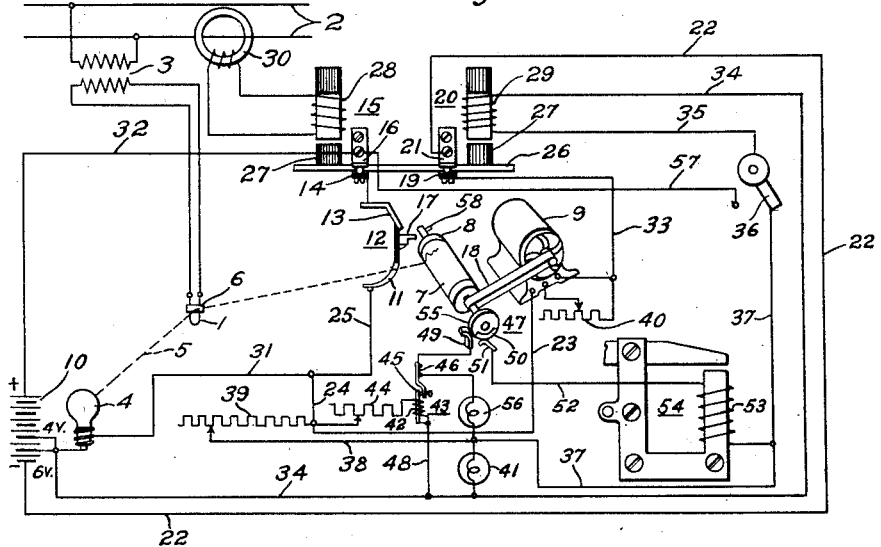

March 10, 1931.  J. W. LEGG  1,795,870
OSCILLOGRAPH
Filed May 13, 1929

INVENTOR
Joseph W. Legg, Deceased
Esther L. Legg, Administratrix.
BY
ATTORNEY

Patented Mar. 10, 1931

1,795,870

UNITED STATES PATENT OFFICE

JOSEPH W. LEGG, DECEASED, LATE OF WILKINSBURG, PENNSYLVANIA, BY ESTHER L. LEGG, ADMINISTRATRIX, OF WORCESTER, MASSACHUSETTS, ASSIGNOR TO WESTINGHOUSE ELECTRIC AND MANUFACTURING COMPANY, A CORPORATION OF PENNSYLVANIA

OSCILLOGRAPH

Application filed May 13, 1929. Serial No. 362,612.

The invention relates to oscillographs and particularly to oscillographs designed to automatically record the chance disturbances or transients which may occur on a transmission line.

The abnormal or chance disturbances which occur on a transmission line may be divided into two classes: viz, those which are produced by normal switching operations or the like and which last for only a short period and those which are caused by an unusual occurrence, such as a short circuit on the line or a stroke of lightning, and which last for a long period, as compared with the duration of the disturbances in the class first mentioned.

Apparatus formerly employed for automatically recording line disturbances would either put the recording apparatus into operative condition for a definite period in response to disturbances of both classes or put it into operation only in response to the disturbances of the longer duration. In the latter case, there was a definite delay before the apparatus was put into operation and, consequently, the first part of each disturbance was never recorded. This apparatus is designed to overcome the defects mentioned above.

One object of the invention is to provide apparatus for automatically recording one or more of the transients or chance disturbances which may occur on a transmission line.

A further object of the invention is to provide apparatus which will become operative almost instantly upon the occurrence of a disturbance on the line, but which will not remain operative for a definite length of time unless the disturbance lasts longer than a predetermined period.

In practicing the invention, there are employed a galvanometer deflecting-element connected to a transmission line, an incandescent lamp, a film holder, a motor for driving the film holder and quick-acting relay and a slow-acting hold-in relay connected to the line for connecting the incandescent lamp and the film-driving motor to a storage battery in response to a disturbance on the line.

In one embodiment of the invention, the filmholder is of the rotary drum type, and the apparatus includes a switch on the rotating drum, a knock-out switch, a trip magnet and a shutter, when utilizing the apparatus for a stage test. The circuit of this embodiment includes a thermal relay which may be utilized either to determine the time lag occurring before the apparatus starts recording, or the length of time that the apparatus records after it becomes operative.

In one modification of the invention, the film holder is of the long-film type and the knock-out switch, trip magnet and shutter are omitted. The circuit of this modification includes a thermal relay which is utilized only for determining the length of time that the apparatus records after it becomes operative.

Other features and advantages of the invention will appear from the following description, taken in connection with the accompanying drawing, in which Figure 1 is a schematic diagram of the apparatus and electrical connections employed in one embodiment of the invention.

Figure 2:
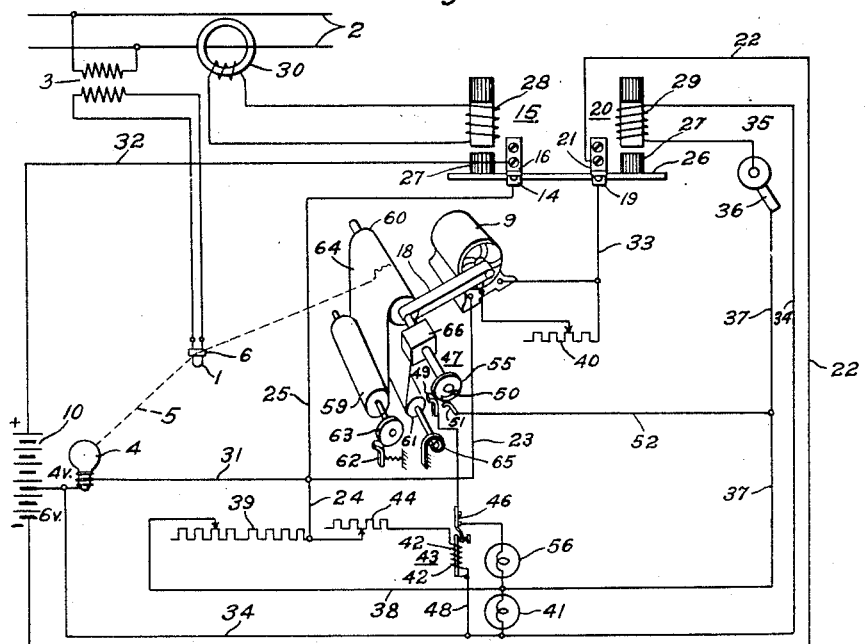

Fig. 2 is a schematic diagram of the apparatus and electrical connections employed in a modification of the invention.

Referring to Fig. 1, the apparatus comprises a galvanometer deflecting element 1 connected to a transmission line 2 by means of a transformer 3. An incandescent lamp 4 is so positioned that it directs a beam of light 5 against a mirror 6 attached to the galvanometer deflecting element 1. The beam of light 5 is reflected from the mirror 6 to the film 7 and vibrated in accordance with the disturbances occurring on the transmission line 2. The film 7 is attached to a rotatable drum 8 which is rotated by means of a motor 9. The incandescent lamp 4, the galvanometer element 1 and the film drum 8 are located inside a light-proof casing, as shown, for example, in United States Patent No. 1,672,894, granted June 12, 1928.

One terminal of the incandescent lamp 4 is connected to the negative 4-volt terminal of a storage battery 10. The other terminal of the incandescent lamp 4 is connected to the flexible arm 11 of a knock-out switch 12.

The upper contact point 13 of the switch 12 is connected to the lower contact point 14 of a relay 15 while the corresponding upper contact point 16 is connected to the positive terminal of the storage battery 10. The flexible arm 11 of the knock-out switch 12 is held in contact with the contact point 13 until a pin 17, secured to the flexible member 11, is moved upwardly.

As previously mentioned, the film drum 8 is rotated by the motor 9 which is connected thereto by means of a belt 18. One terminal of the motor 9 is connected to the lower contact point 19 of a hold-in relay 20 by means of conductor 33. The corresponding upper contact point 21 is connected to the negative 6-volt terminal of the battery 10 by means of conductor 22.

The other terminal of the motor 9 is connected to the flexible arm 11 of the knock-out switch 12 by means of conductors 23, 24 and 25. With this circuit arrangement, when the armature 26 of the relays 15 and 20 is pulled up, a circuit is completed from the negative 6-volt terminal of the storage battery 10, through the conductor 22, the contact points 21 and 19, the motor 9, the conductors 23, 24 and 25. the knock-out switch 12, the contact points 14 and 16, through the conductor 32, to the positive terminal of the storage battery 10. A resistance 40 is connected into the motor field circuit to control the speed of the motor 9.

It will be seen that the lower contact points 14 and 19 of relays 15 and 20, respectively, are connected to the movable member or armature 26. Elements 27 of magnetic material are so attached to the armature 26 that they are attracted by either the winding 28 of the quick-acting relay 15 or by the winding 29 of the slow-acting relay 20 to pull in the armature 26 and close the contact points 14, 16 and 19, 21.

The quick-acting relay 15 is connected to the transmission line 2 by any suitable means, such as a current transformer 30. In this way, the quick-acting relay 15 is caused to close the contact points 14, 16 and 19, 21 simultaneously at the beginning of a disturbance on the transmission line 2.

When the contact points 14 and 16 close, the oscillograph incandescent lamp 4 is lighted by the completion of a circuit from the negative 4-volt terminal of the storage battery 10, through the incandescent lamp 4, conductors 31 and 25, the knock-out switch 12, the contact points 14, 16 and the conductor 32, to the positive terminal of the storage battery 10.

At the same time, the motor 9 is put into operation by the completion of a circuit from the negative 6-volt terminal of the storage battery 10, through the conductor 22, the contact points 21, 19, the conductor 33, the motor 9, the conductors 23, 24 and 25, the knock-out switch 12, the contact points 14 and 16 and the conductor 32, to the positive terminal of the battery 10.

The instant the contact points 14 and 16 are closed, a circuit is completed through the winding 29 of the slow-acting hold-in relay 20. This circuit may be traced from the negative 4-volt terminal of the battery 10, through a conductor 34, the winding 29 of the hold-in relay 20, a conductor 35, a switch 36, conductors 37 and 38, a delay rheostat 39, the conductors 24 and 25, the knock-out switch 12, the contact points 14 and 16 and the conductor 32, to the positive terminal of the battery 10.

The hold-in relay 20 is made slow-acting by connecting a lamp 41 having a filament of tungsten, or of some other material having a positive temperature coefficient, in parallel with the winding 29. Since the resistance of the filament of such a lamp is low, before it becomes heated, (about one-tenth of its hot resistance) the tungsten lamp 41 will shunt the greater part of the current around the relay winding 29 when the hold-in relay 20 is first connected across the battery 10. An instant later, the resistance of the lamp filament increases to such an extent that sufficient current will flow through the winding 29 to make the relay 20 operative. The amount of delay given by the hold-in relay 20 may be varied, either by adjusting the position of the slider of the delay control rheostat 39 or by changing the size of the delay lamp employed. Any slow-acting relay which will give a small delay for a definite period may be substituted for that of the particular type illustrated.

At the same time that the contact points 14 and 16 close, a circuit is completed from the negative 4-volt terminal of the battery 10 through the conductor 34, the heating winding 42 of the thermal relay 43, a duration control rheostat 44, the conductor 24, the knock-out switch 12, the contact points 14 and 16, and the conductor 32, to the positive terminal of the battery 10. The heating winding 42 of the thermal relay is wound on a bi-metallic strip 45 which has its lower end connected to the lower end of the heating winding 42.

When heated a sufficient amount, the bi-metallic strip 45 will bend to make contact with a contact point 46 and (when the rotatable switch 47 is in the proper position) will complete a circuit from the negative 4-volt terminal of the battery 10, through conductors 34 and 48, the bi-metallic strip 45, the contact point 46, a brush 49 of a rotatable switch 47, a conducting segment 50 the brush 51 of the switch 47, a conductor 52, and the winding 53 of a trip magnet 54, to the conductor 37.

The rotatable switch 47 comprises a disc 55 of insulating material so secured to the shaft of the film drum 8 that it may be turned to any desired position relative to the film 7 on the film drum. The conducting segment is embedded near the periphery of the disc 55. The brushes 49 and 51 make contact with the periphery of the disc 55 and are so adjusted that, when the conducting segment 50 is in a certain position, both brushes make contact therewith.

An incandescent lamp 56 has one terminal thereof connected to the conductor 38 and its other terminal connected to the contact point 46 of the thermal relay 43. This lamp gives an indication of the time when the thermal relay 43 closes. When the thermal relay closes, a circuit is completed from the negative 4-volt terminal of the battery 10 through the conductors 34 and 48, the bi-metallic strip 45, the contact point 46, the indicator lamp 56, the conductor 38, the delay rheostat 39, the conductors 24 and 25 knock-out switch 12, the contact points 14 and 16 and the conductor 32, to the positive terminal of the battery 10. If desired, the lamp 56 may be omitted from the circuit.

When the switch 36 is in the position shown, the apparatus is in condition for automatically recording any chance disturbance which may occur on the transmission line 2. However, it may be desired to intentionally create a short-circuit on the line and then to record the effect of the short-circuit. Such operation is produced by turning the switch 36 to the left to connect the lower terminal of the relay winding 29 to the positive terminal of the storage battery 10 through conductors 57 and 32. In this case, the trip magnet 54 is employed for initiating the short-circuit. When the apparatus is in condition for automatically recording disturbances, the trip magnet is not utilized.

When the switch is in the position shown for automatic operation, the operation is as follows: the instant that an abnormal current appears in the transmission line 2, the quick-acting relay 15 pulls in the armature 26 and closes the contact points 14, 16 and 19, 21. This connects the oscillograph lamp 4 across the 4-volt section of the storage battery 10. It also connects the motor 9 across the 6-volt section of the storage battery. As a result, a beam of light 5 is directed against the galvanometer mirror 6 and reflected to the film drum 8 which is now being rotated by the motor 9. It will be seen that the apparatus starts recording the disturbance at almost the instant it occurs.

At the same time that the incandescent lamp 4 and the motor 9 are put into operation, the holding relay 20 is connected across the 4-volt section of the battery 10. As previously explained, however, the hold-in relay 20 will not become operative until the filament of the tungsten lamp 41 has had time to become heated. If the disturbance is of very short duration, the hold-in relay 20 will not have time to take effect, and the quick-acting relay 15 will permit the contact points 14, 16 and 19, 21 to open as soon as the disturbance ceases. On the other hand, if the disturbance is of sufficient duration, (.02 of a second, for example) the hold-in relay 20 will have time to become operative. In that case, the lamp 4 will remain lighted, and the motor 9 will continue to operate for a definite period which is determined by the adjustment of the thermal relay 45.

As previously pointed out, the instant the contact points 14 and 16 close, current begins flowing through the heating winding 42 of the thermal relay 43. After a definite period, the bi-metallic strip 45 is heated sufficiently to bend and release the armature 26 by making contact with the upper contact point 46.

When employing a film holder of the rotary drum type, the thermal relay 43 should be so adjusted that it will close before one half of the film has been exposed and just before the conducting segment 50 of the rotating switch 47 makes contact with the brushes 49 and 51 with such an adjustment, when one half of the film has been exposed, the thermal relay 43 closes and, immediately thereafter, the rotating switch 47 completes the circuit from the contact point 46 to the upper terminal of the winding 53 of the trip magnet.

As soon as the rotating switch 47 completes the circuit above-mentioned, a short-circuit is established across the winding 29 of the hold-in relay 20 from the conductor 34, through the conductor 48, the bi-metallic strip 45, the contact point 46, the rotating switch 47, the conductor 52, the winding 53 of the trip magnet 54 through the conductor 37, the switch 36, to the conductor 35. This causes the hold-in relay 20 to release the armature 26 to open the contact points 14, 16 and 19, 21 unless the line disturbance is still in existence. When the contact points 14, 16 and 19, 21 open, the lamp 4 is extinguished, the motor 9 stops and the apparatus is in condition for recording one more disturbance.

While the apparatus is in condition to record the second disturbance the conducting segment 50 of the rotating switch 47 is in contact with brushes 49 and 51, the position in which it was left at the end of the first record. The thermal relay 43, however, has had time to cool, and the bi-metallic strip 45 is no longer making contact with the contact point 46. When the second disturbance of the necessary duration occurs, the operation described above is repeated, at the end of the second record, since the entire length of the film 7 has been exposed, the apparatus is made inoperative by means of a projection 58 secured to the film-drum shaft which makes contact with the pin 17 on the knock-out switch 12 and knocks the switch 12 open. The apparatus must be manually reset by closing the knock-out switch 12 before another disturbance can be recorded.

The circuit shown in Fig. 2 is the same as that shown in Fig. 1, except that the knock-out switch 12 and the trip magnet 54 have been omitted. The right-hand brush 51 of the rotatable switch 47 is connected directly to the conductor 37 instead of being connected to the conductor 37 through the winding of a trip magnet. Likewise, the lower contact point 14 is connected directly to the conductor 31, by means of conductor 25 instead of being connected to it through a knock-out switch.

In place of a film holder, of the rotating-drum type, the film holder of the long-film type, described and claimed in my copending application, Serial No. 195,400, filed September 13, 1928, is employed. Obviously, film holders of other types may be employed, if desired. The long-film holder comprises a supply spool 59, a drum 60 which is connected to the motor 9 by means of a belt 18 and a take-up spool 61. The supply spool 59 is prevented from unreeling too rapidly by means of a member 62 which frictionally engages a disc 63 attached to the shaft of the supply spool 59.

The take-up spool 61 is provided with means for rotating it in the proper direction to take up the film 64 as soon as it leaves the main drum 60. In the illustration, the means for rotating the take-up spool 61 comprises a spiral spring 65, the inner end of which is secured to the shaft of the take-up spool 61 and the outer end of which is attached to some solid support.

The rotatable switch 47 is connected to the the main drum 60 through a reduction gear 66. The particular gear ratio employed is such that every rotation of the rotating switch 47 represents a one-third rotation of the main drum 60 of the film holder or the movement of four inches of film past the vibrating light beam, when employing a main drum twelve inches in circumference.

The operation of the circuit shown in Fig. 2 is identical with the automatic operation of the circuit shown in Fig. 1, except that the instant that the apparatus is made inoperative is determined entirely by the thermal relay 43 and the rotating switch 47. Since the long-film holder is employed, there is no necessity for a knock-out switch to prevent superimposing of records. With the long-film holder, the number of records which may be recorded automatically is limited only by the length of the film employed.

The thermal relay 43 may be adjusted, by the duration rheostat 44, to close before the rotating switch 47 can make one revolution. In this case, exposures four inches long are obtained. Also, the thermal relay 43 may be so adjusted as not to close during the first revolution of the rotating switch 47 but to close before it can make two revolutions or before it can make three revolutions. In this way, it is easy to obtain definite exposures, either eight inches or twelve inches long.

If desired, the rotating switch 47 may be short-circuited so that the time that each record ends is determined entirely by the thermal relay 43. This arrangement will ordinarily give satisfactory results, although the time that the thermal relay closes can be controlled only within certain limits.

The circuit shown in Fig. 1 may be employed for making a stage test by turning the switch 36 to the left. When making a stage test the combination of trip magnet rotating switch or contactor film drum, shutter and knock-out switch, described in U. S. Patent No. 1,672,894 is utilized.

As soon as the switch 36 is turned to the left, the hold-in relay 20 is connected to the storage battery 10 through a circuit which may be traced from the negative 4-volt of the battery 10 through the conductor 34, the relay winding 29, the conductor 35, the switch 36, and the conductors 57 and 32, to the positive terminal of the battery 10. This pulls in the armature 26 and closes the contact points 14, 16 and 19, 21 to connect the oscillograph lamp 4 and the motor 9 to the battery 10, in the manner previously explained. At the same time, as previously explained, a circuit is completed through the heating winding 42 of the thermal relay 43.

After a predetermined period, the bimetallic strip 45 makes contact with the contact point 46, and the instant that the rotating switch 47 closes, the trip magnet 54 is actuated by the completion of a circuit from the negative 4-volt terminal of the battery 10 through the conductors 34 and 48, the bi-metallic strip 45, the contact point 46, the rotating switch 47, the conductor 52, the winding 53 of the trip magnet 54, the conductors 37 and 38, the delay rheostat 39, the conductors 24 and 25, the knock-out switch 12, the contact points 14, 16 and the conductor 32, to the positive terminal of the battery 10.

The actuation of the trip magnet 54 closes a remote-control switch which initiates the short circuit or other disturbance on the transmission line that is to be recorded. The actuation of the trip magnet 54 also releases a pin attached to the shutter, as described in the aforesaid patent, to put the shutter in such position that it will be open when the film drum 8 reaches the proper position.

As soon as the film drum 8 reaches the proper position, the shutter is opened and a record of the disturbance is made.

When the entire length of the film has been exposed, the rotation of the film drum 8 releases the shutter and it closes, at the same time knocking open the knock-out switch 12. The apparatus must be reset for a second test.

It will be noted that, when the thermal relay 43 is utilized in the manner described above, it enables an operator to close the switch 36 and then reach a position a safe distance from the short circuit which is initiated.

From the above description, it will be understood that when the apparatus is employed for conducting a staged test the knock-out switch 12 is knocked open by means of the rotating drum 8 and shutter mechanism described in my aforesaid patent instead of by means of the specific mechanism illustrated in Fig. 1.

The resistances of the elements preferably employed in my apparatus are as follows:

| | Ohms |
|---|---|
| Trip-magnet winding | .41 |
| Hold-in magnet winding | 3.18 |
| Thermal relay winding | 8.00 |
| Delay rheostat | 1.65 |
| Duration rheostat | 3.00 |
| Indicator lamp (hot resistance) | 40.00 |
| Delay lamp (hot resistance) | 12.7 or 3.0 |

Obviously, other resistance values may be employed if desired.

Various modifications may be made in the invention without departing from the spirit and scope thereof and it is desired, therefore, that only such limitation shall be placed thereon as are shown by the prior art and set forth in the appended claims.

What is claimed is:

1. A recording system comprising a source of light, a recording surface, means for directing a beam of light from said source against said surface in accordance with a quantity to be measured, means including a motor for moving said recording surface, means responsive to the quantity to be measured for putting said source of light and said motor into operative condition, said means comprising two relays, one of which operates more slowly than the other, and means responsive to said one relay for holding said source of light and said motor in operative condition.

2. A recording system comprising a source of light, a recording surface, means for directing a beam of light from said source against said surface in accordance with a quantity to be measured, means including a motor for moving said recording surface, and means responsive to the quantity to be measured for putting said source of light and said motor into operative condition, said means comprising a quick-acting relay and a slow-acting hold-in relay.

3. A system for recording an electrical disturbance on a line, said system comprising a deflecting element and means for connecting said element to said line, means normally inoperative for recording the movement of said deflecting element, means for making said last-named means operative in response to said disturbance and for keeping said last-named means operative for at least a predetermined length of time only when said disturbance lasts longer than a predetermined period.

4. A system for recording an electrical disturbance transmitted by a conductor, said system comprising a mirror supported by a deflecting element, means for connecting said element to said conductor, means for directing a beam of light against said mirror, a recording surface positioned in the path of the beam of light reflected from said mirror, means for moving said recording surface, and means for making said second-named means operative for a predetermined length of time only if said disturbance lasts longer than a predetermined period.

5. In combination with means for recording a chance disturbance, means for putting said first-named means into operative condition and for holding it in that condition for a predetermined length of time only if said disturbance lasts longer than a predetermined period.

6. In combination with means for recording a chance disturbance, means including a quick-acting relay for putting said first-named means into operative condition and means including a slow-acting relay for at least holding it in that condition for a predetermined length of time only if said disturbance lasts longer than a predetermined period.

7. In combination with means for recording a chance disturbance, means including a quick-acting relay for putting said first-named means into operative condition and means including a slow-acting relay for at least holding it in that condition for a predetermined length of time only if said disturbance lasts longer than a predetermined period, each of said relays including an armature, said armatures being mechanically connected.

8. Electrical apparatus comprising means for recording a disturbance occurring on a line, means including a quick-acting relay for putting said recording means into operative condition in response to said disturbance, means including a hold-in relay for holding said apparatus in operative condition, and means including a thermal relay for making said hold-in relay inoperative after a predetermined time.

9. Electrical apparatus comprising means for recording a disturbance occurring on a line, means including a quick-acting relay for putting said recording means into operative condition in response to said disturbance, means including a slow-acting hold-in relay for holding said apparatus in operative condition, and means including a thermal relay for making said hold-in relay inoperative after a predetermined time.

10. Electrical apparatus comprising means for recording a disturbance occurring on a line, means including a quick-acting relay for putting said recording means into operative condition in response to said disturbance, means including a hold-in relay for holding said apparatus in operative condition and means including a thermal relay for shunting current around the coil of said hold-in relay after a predetermined time.

11. Electrical apparatus for recording a disturbance occurring on a line, said apparatus comprising a quick-acting relay connected to said line, a slow-acting relay and means including an armature for connecting said slow-acting relay to a source of current in response to the operation of said quick-acting relay, said armature being so positioned that it may be operated by either or both of said relays.

12. Electrical apparatus for recording a disturbance occurring on a line, said apparatus comprising a quick-acting relay connected to said line, a slow-acting relay, an armature common to said relays, and means, including said armature, for connecting said slow-acting relay to a source of current in response to the operation of said quick-acting relay.

13. Electrical recording apparatus comprising a movable recording surface, means for making a record of an electrical quantity on said recording surface and means for determining the instant that one edge of said record shall be positioned on said recording surface, said means comprising a switch so connected that it moves in response to the movement of said recording surface and a thermal relay having contact points connected in series with said switch.

14. Electrical recording apparatus comprising a recording surface, means including a relay winding for making a record of an electrical quantity on said recording surface, and means for determining the location of one edge of said record on said recording surface, said means comprising a thermal relay having contact points so connected that, when said contact points close, a shunt circuit is established around said relay winding.

15. Electrical recording apparatus comprising a movable recording surface, means for closing an electrical circuit in response to a disturbance on a line, means for holding said circuit closed, and means for making said second-named means inoperative after a predetermined period, said last-named means comprising a thermal relay having contact points in series with a switch actuated by the movement of said recording surface.

16. Recording apparatus comprising a recording surface, means for moving said recording surface, means for directing a beam of light against said recording surface in response to the closing of a relay and for vibrating said beam in accordance with a quantity to be measured, means for holding said relay closed, means including a thermal relay having contact points in series with a switch actuated by the movement of said recording surface for rendering said last-named means inoperative after a predetermined time whereby said record ends at a definite point on said recording surface.

17. A recording system comprising a source of light, a recording surface, means for directing a beam of light from said source against said surface in accordance with a quantity to be recorded, means responsive to the quantity to be recorded for putting said source of light into operative condition, said means comprising two relays, one of which operates more slowly than the other, and means responsive to said one relay for holding said source of light in operative condition.

18. A recording system comprising a source of light, a recording surface, means for directing a beam of light from said source against said surface in accordance with a quantity to be recorded, means including a motor for moving said recording surface, means responsive to the quantity to be recorded for putting said motor into operative condition, said means comprising two relays, one of which acts more slowly than the other, and means responsive to said one relay for holding said motor in operative condition.

In testimony whereof, I have hereunto subscribed my name this 20th day of April, 1929.

ESTHER L. LEGG,
*Administratrix of the Estate of Joseph W. Legg, Deceased.*